(12) United States Patent
Schmale et al.

(10) Patent No.: US 11,518,102 B2
(45) Date of Patent: Dec. 6, 2022

(54) BUILD MATERIAL EXTRACTION USING VIBRATION AND AIRFLOW

(71) Applicant: HEWLETT-PACKARD DEVELOPMENT COMPANY, L.P., Houston, TX (US)

(72) Inventors: Joshua Schmale, Vancouver, WA (US); Robert Lawrence Winburne, Vancouver, WA (US); Tait A. Regnier, Vancouver, WA (US); Michael Duda, Vancouver, WA (US); Justin M. Roman, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1131 days.

(21) Appl. No.: 16/075,625

(22) PCT Filed: Jul. 19, 2017

(86) PCT No.: PCT/US2017/042719
§ 371 (c)(1),
(2) Date: Aug. 4, 2018

(87) PCT Pub. No.: WO2019/017925
PCT Pub. Date: Jan. 24, 2019

(65) Prior Publication Data
US 2021/0323232 A1    Oct. 21, 2021

(51) Int. Cl.
*B29C 64/35* (2017.01)
*B33Y 30/00* (2015.01)
(Continued)

(52) U.S. Cl.
CPC ............ *B29C 64/35* (2017.08); *B29C 64/165* (2017.08); *B29C 64/209* (2017.08);
(Continued)

(58) Field of Classification Search
None
See application file for complete search history.

(56) References Cited

U.S. PATENT DOCUMENTS

| | | | |
|---|---|---|---|
| 6,814,823 | B1 | 11/2004 | White |
| 8,185,229 | B2 | 5/2012 | Davidson |

(Continued)

FOREIGN PATENT DOCUMENTS

| | | |
|---|---|---|
| CN | 104191616 A | 12/2014 |
| CN | 104191616 A | 12/2014 |

(Continued)

OTHER PUBLICATIONS

Redwood, "Additive Manufacturing Technologies: An Overview", 3D Hubs, Retrieved from Internet—https://www.3Dhubs.com/knowledge-base/additive-manufacturing-technologies-overview, 2017, 17 pages.

(Continued)

*Primary Examiner* — Matthew J Daniels
*Assistant Examiner* — Paul Spiel
(74) *Attorney, Agent, or Firm* — Fabian VanCott

(57) ABSTRACT

In one example in accordance with the present disclosure, an additive manufacturing platform is described. The additive manufacturing platform includes a vibrating bed on which a volume of build material is to be disposed. The bed is to vibrate to remove excess build material and operates in at least two extraction modes during a build material extraction period. The additive manufacturing platform also includes a non-vibrating frame to support the vibrating bed.

19 Claims, 7 Drawing Sheets

(51) Int. Cl.
*B33Y 40/00* (2020.01)
*B33Y 50/02* (2015.01)
*B29C 64/245* (2017.01)
*B29C 64/393* (2017.01)
*B29C 64/165* (2017.01)
*B29C 64/357* (2017.01)
*B08B 7/02* (2006.01)
*B29C 64/209* (2017.01)
*B08B 5/04* (2006.01)

(52) U.S. Cl.
CPC .......... *B29C 64/245* (2017.08); *B29C 64/393* (2017.08); *B33Y 30/00* (2014.12); *B33Y 40/00* (2014.12); *B33Y 50/02* (2014.12); *B08B 5/04* (2013.01); *B08B 7/02* (2013.01); *B29C 64/357* (2017.08)

(56) References Cited

U.S. PATENT DOCUMENTS

| | | |
|---|---|---|
| 2002/0090410 A1 | 7/2002 | Tochimoto |
| 2002/0145213 A1 | 10/2002 | Liu et al. |
| 2007/0126157 A1 | 6/2007 | Bredt |
| 2011/0233808 A1* | 9/2011 | Davidson ................ B29C 64/35 425/456 |
| 2015/0266158 A1 | 9/2015 | Summers et al. |
| 2015/0266211 A1 | 9/2015 | Wolfgang |
| 2016/0074940 A1 | 3/2016 | Cote et al. |
| 2016/0228929 A1 | 8/2016 | Williamson et al. |
| 2016/0279871 A1 | 9/2016 | Heugel |
| 2016/0279873 A1* | 9/2016 | Fette ................ B33Y 30/00 |
| 2016/0332251 A1 | 11/2016 | Bunker et al. |
| 2017/0282457 A1* | 10/2017 | Burns ................ B29C 64/30 |
| 2019/0126555 A1* | 5/2019 | Lebed ................ B22F 10/20 |
| 2019/0299534 A1* | 10/2019 | Fernandez Orive .... B29C 64/35 |

FOREIGN PATENT DOCUMENTS

| | | |
|---|---|---|
| CN | 104640686 | 5/2015 |
| CN | 204741543 | 11/2015 |
| DE | 102012106141 | 1/2014 |
| EP | 3167980 A1 | 5/2017 |
| JP | H10148181 A | 6/1998 |
| RU | 2228134 C1 | 5/2004 |
| RU | 2228134 C1 | 5/2004 |
| RU | 2333044 C2 | 9/2008 |
| RU | 2333044 C2 | 9/2008 |
| SU | 632485 A1 | 11/1978 |
| SU | 632485 A1 | 11/1978 |
| SU | 1247151 A1 | 7/1986 |
| SU | 1247151 A1 | 7/1986 |
| WO | 2007039450 A1 | 4/2007 |
| WO | WO-2007039450 A1 | 4/2007 |
| WO | 2015200280 A1 | 12/2015 |
| WO | WO-2015200280 A1 | 12/2015 |

OTHER PUBLICATIONS

Ben Redwood, Additive Manufacturing Technologies: An Overview, Jun. 20, 2017, <https://www.3Dhubs.com/knowledge-base/additive-manufacturing-technologies-overview>.

* cited by examiner

BUILD MATERIAL EXTRACTION USING VIBRATION AND AIRFLOW

BACKGROUND

Additive manufacturing devices produce three-dimensional (3D) objects by building up layers of material. 3D printing devices and other additive manufacturing devices make it possible to convert a computer-aided design (CAD) model or other digital representation of an object directly into the physical object.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
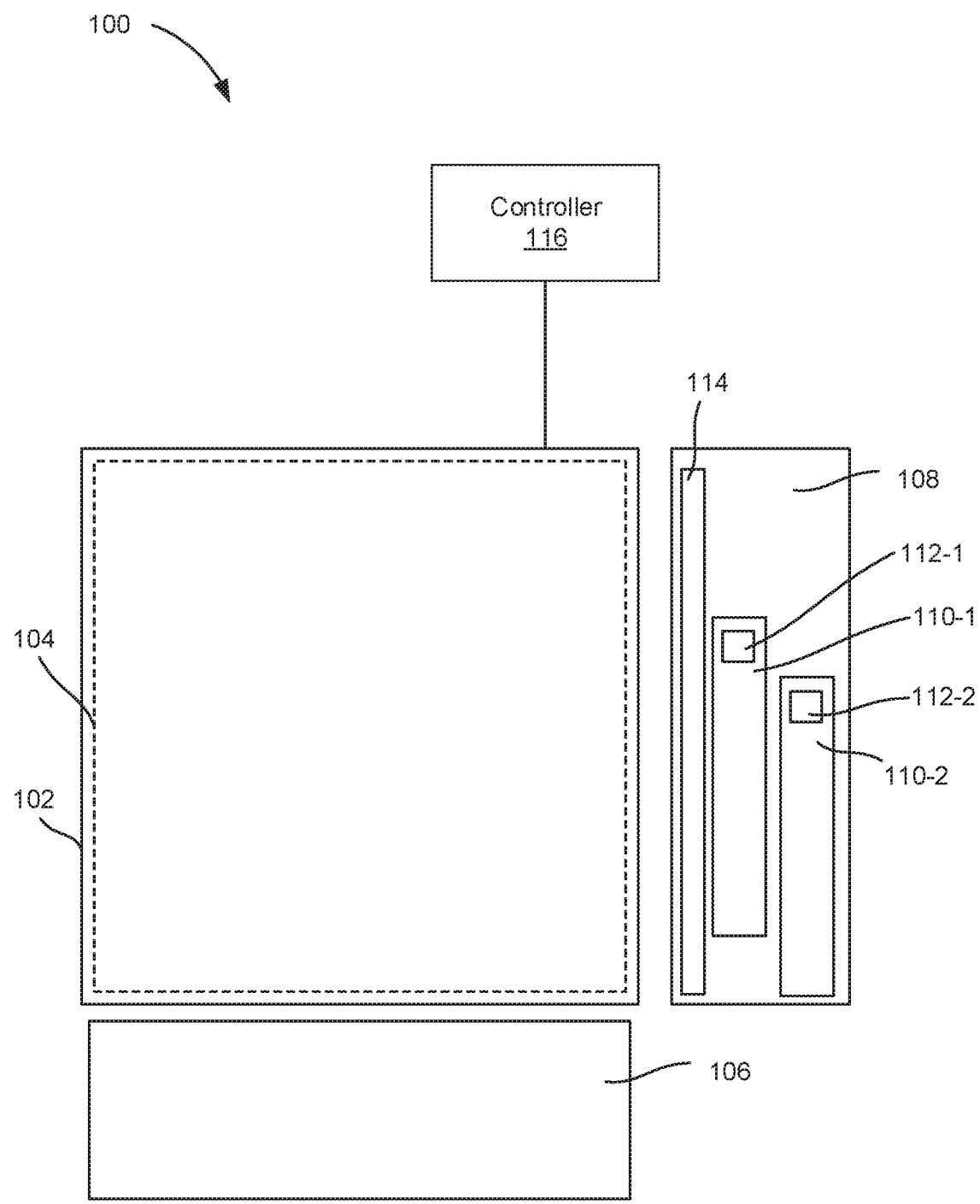
FIG. 1 is a simplified top diagram of an additive manufacturing system for build material extraction using vibration and airflow, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description: however, the description is not limited to the examples and/or implementations provided in the drawings.

DETAILED DESCRIPTION

Additive manufacturing devices make a three-dimensional (3D) object through the solidification of layers of a build material on a bed within the device. Additive manufacturing devices make objects based on data in a 3D model of the object generated, for example, with a computer-aided drafting (CAD) computer program product. The model data is processed into slices, each slice defining a layer of build material that is to be solidified.

One specific example of an additive manufacturing process is a thermal fusing process. In a thermal fusing process to form the 3D object, a build material, which may be powder or a powder-like material, is deposited on a bed. A fusing agent is then dispensed onto portions of the layer of build material that are to be fused to form a layer of the 3D object. The fusing agent disposed in the desired pattern increases the absorption of the underlying layer of build material on which the agent is disposed. The build material is then exposed to energy such as electromagnetic radiation. The electromagnetic radiation may include infrared light or other suitable electromagnetic radiation. Due to the increased heat absorption properties imparted by the fusing agent, those portions of the build material that have the fusing agent disposed thereon heat to a temperature greater than the fusing temperature for the build material.

As energy is applied to a surface of the build material, the build material that has received the fusing agent, and therefore has increased energy absorption characteristics, heats up, melts, and fuses while that portion of the build material that has not received the fusing agent remains in powder form. By comparison, the applied heat is not so great so as to increase the heat of the portions of the build material that are free of the fusing agent to this fusing temperature. This process is repeated in a layer-wise fashion to generate a 3D object. The unfused portions of material can then be separated from the fused portions, and the unfused portions recycled for subsequent 3D printing operations.

While specific reference is made to a thermal fusing process with fused and unfused material, the platform, system, and method of the present specification may also be implemented in 3D printing systems that print a chemical binder. Accordingly, unfused build material in a thermal fusing process may be an example of non-solidified material. Accordingly, in the present specification and in the appended claims, the term non-solidified build material may refer to excess build material, and unfused build material may be an example of such non-solidified build material.

Accordingly, the present specification describes an improved system and method for separating the non-solidified from the 3D printed object. Specifically, the present specification describes a platform that includes a vibrating bed. The vibrating bed includes ports through which non-solidified build material falls into a chamber. In some examples, a vacuum system in the chamber then draws the unused build material into a reservoir. In other words, the additive manufacturing platform of the present specification relies on a combination of vibration to remove non-solidified build material from the build area into a chamber and vacuum system to remove the non-solidified build material from the chamber to a reservoir.

The present specification also describes a control system that executes different build material extraction modes. For example, there may be at least different extraction modes. During a first mode, immediately following completion of an additive manufacturing process, a lot of loose non-solidified build material may surround the 3D printed object. In this first mode, the vibrating bed may be vibrated more gently, to allow the loose non-solidified build material to pass through the ports. Following removal of the loose non-solidified build material, some of the non-solidified build material which is nearer the 3D printed object may be more tightly adhered to the 3D printed object. Accordingly, during a second mode the vibrating bed may be vibrated more aggressively to remove this agglomerated non-solidified build material.

Specifically, the present specification describes an additive manufacturing platform. The additive manufacturing platform includes a vibrating bed on which a volume of build material is to be disposed. The vibrating bed vibrates to remove excess build material to a chamber, which excess build material is removed via an airflow to a reservoir. The additive manufacturing platform also includes a non-vibrating frame to support the vibrating bed. In some examples, the additive manufacturing platform, or build unit, is separate from an additive manufacturing device such as a 3D printer. In other examples, the additive manufacturing platform, is integrated with the 3D printer.

The present specification also describes an additive manufacturing system. The additive manufacturing system includes a build material distributor to successively deposit layers of build material into a build area. At least one agent distributor of the system includes at least one liquid ejection device to selectively distribute fusing agent onto the layers of build material. The additive manufacturing system also includes a platform on which the build material is to be disposed. The platform includes the vibrating bed to remove excess build material into a chamber below the vibrating bed and the non-vibrating frame. The additive manufacturing system also includes a vacuum system to draw excess build material from the chamber to the reservoir and a controller to execute different extraction modes during a build material extraction period.

The present specification also describes a method. According to the method a build file for a three-dimensional object is acquired and input indicating object build material and extraction sensitivity are received. Extraction parameters are then set based on the build file, indicated object build material, and indicated extraction sensitivity. The vibrating bed of the additive manufacturing platform is then controlled in accordance with the extraction parameters.

In summary, using such an additive manufacturing platform 1) allows for efficient additive manufacturing processes by re-using non-solidified build material; 2) increases the amount of non-solidified build material that is recycled via a vibrating platform that directs non-solidified build material to vacuum ports; 3) delivers 3D printed objects that are completed with fewer post-processing operations; and 4) combines airflow and vibration which reduces the magnitude of each as compared to when each is used alone. However, it is contemplated that the devices disclosed herein may address other matters and deficiencies in a number of technical areas.

FIG. 1 is a simplified top diagram of an additive manufacturing system (100) for build material extraction using vibration and airflow, according to an example of the principles described herein. In general, apparatuses for generating three-dimensional objects may be referred to as additive manufacturing systems (100). The system (100) described herein may correspond to three-dimensional printing systems, which may also be referred to as three-dimensional printers. In an example of an additive manufacturing process, a layer of build material may be formed in a build area (104). As used in the present specification and in the appended claims, the term "build area" refers to an area of space wherein the 3D object is formed. The build area (104) may refer to a space bounded by the platform (102) and chamber walls.

In the additive manufacturing process, any number of functional agents may be deposited on the layer of build material. One such example is a fusing agent that facilitates the solidification of the powder build material. In this specific example, the fusing agent may be selectively distributed on the layer of build material in a pattern of a layer of a three-dimensional object. An energy source may temporarily apply energy to the layer of build material. The energy can be absorbed selectively into patterned areas formed by the fusing agent and not absorbed into blank areas that have no fusing agent, which leads to the powder build material and previously fused layers to selectively fuse together. This process is then repeated until a complete physical object has been formed. Accordingly, as used herein, a build layer may refer to a layer of build material formed in a build area (104) upon which the functional agent may be distributed and/or energy may be applied.

Additional layers may be formed and the operations described above may be performed for each layer to thereby generate a three-dimensional object. Sequentially layering and fusing portions of layers of build material on top of previous layers may facilitate generation of the three-dimensional object. The layer-by-layer formation of a three-dimensional object may be referred to as a layer-wise additive manufacturing process.

In examples described herein, a build material may include a powder-based build material, where the powder-based build material may include wet and/or dry powder-based materials, particulate materials, and/or granular materials. In some examples, the build material may be a weak light absorbing polymer. In some examples, the build material may be a thermoplastic. Furthermore, as described herein, the functional agent may include liquids that may facilitate fusing of build material when energy is applied. The fusing agent may be a light absorbing liquid, an infrared or near infrared absorbing liquid, such as a pigment colorant.

The additive manufacturing system (100) includes a build material distributor (106) to successively deposit layers of the build material in the build area (104), The build material distributor (106) may include a wiper blade, a roller, and/or a spray mechanism. The build material distributor (106) may be coupled to a scanning carriage. In operation, the build material distributor (106) places build material in the build area (104) as the scanning carriage moves over the build area (104) along the scanning axis. While FIG. 1 depicts the build material distributor (106) as being orthogonal to the agent distributor (108), in some examples the build material distributor (106) may be in line with the agent distributor (108).

The additive manufacturing apparatus (100) includes at least one agent distributor (108). An agent distributor (108) includes at least one liquid ejection device (110-1, 110-2) to distribute a functional agent onto the layers of build material.

One specific example of a functional agent is a fusing agent, which increases the energy absorption of portions of the build material that receive the fusing agent, A liquid ejection device (110) may include at least one printhead (e.g., a thermal ejection based printhead, a piezoelectric ejection based printhead, etc.). In some examples, the agent distributor (106) is coupled to a scanning carriage, and the scanning carriage moves along a scanning axis over the build area (104). In one example, printheads that are used in inkjet printing devices may be used as an agent distributor (108). In this example, the fusing agent may be an ink-type formulation. In other examples, an agent distributor (108) may include other types of liquid ejection devices (110) that selectively eject small volumes of liquid.

The agent distributor (108) includes at least one liquid ejection device (110) that has a plurality of liquid ejection dies arranged generally end-to-end along a width of the agent distributor (108). In such examples, the width of the agent distributor (108) corresponds to a dimension of the build area (104). The agent distributor (104) selectively distributes an agent on a build layer in the build area (104) concurrent with movement of the scanning carriage over the build area (104). In some example apparatuses, the agent distributor (108) includes nozzles (112-1, 112-2) through which the fusing agent is selectively ejected.

The additive manufacturing apparatus (100) also includes at least one heater (114) to selectively fuse portions of the build material to form an object via the application of heat to the build material. A heater (114) may be any component that applies thermal energy. Examples of heaters (114) include infrared lamps, visible halogen lamps, resistive heaters, light emitting diodes LEDs, and lasers. As described above, build material may include a fusible build material that fuses together once a fusing temperature is reached. Accordingly, the heater (114) may apply thermal energy to the build material so as to heat portions of the build material past this fusing temperature. Those portions that are heated past the fusing temperature have a fusing agent disposed thereon and are formed in the pattern of the 3D object to be printed. The fusing agent increases the absorption rate of that portion of the build material. Thus, a heater (114) may apply an amount of energy such that those portions with an increased absorption rate reach a temperature greater than the fusing temperature while those portions that do not have the increased absorption rate to not reach a temperature greater than the fusing temperature. While specific reference is made to deposition of a fusing agent, an additive manufacturing apparatus (100) as described herein may apply any number of other functional agents.

The platform (102) of the additive manufacturing system (100) includes a number of components to, following an additive manufacturing operation, remove unfused build material from the build area (104). Specifically, the platform (102) includes the vibrating bed that holds the volume of build material. A vibration source causes the bed to vibrate to remove excess non-fused build material following formation of a 3D object. In some examples, in addition to a base of the platform, walls of the platform may also vibrate to remove excess non-fused build material. The platform (102) also includes a number of ports through which excess build material falls to an underlying chamber. From the chamber, a vacuum system uses airflow to draw the unfused build material to a reservoir during the build material extraction period. That is, the unfused build material can be recycled.

The platform (102) also includes a non-vibrating frame. The non-vibrating frame supports the vibrating bed. On the non-vibrating frame there are various components, such as lift devices that raise and lower the bed as successive layers of build material are added during the additive manufacturing process. That is, the platform (102) may move in a vertical direction as successive layers of build material are deposited into the build area (104).

It may be desirable to prevent vibrations caused by the vibrating source to pass to the non-vibrating frame and to ensure the vibrating bed is centered relative to the non-vibrating frame. Accordingly, the platform (102) includes an interface that couples the vibrating bed with other non-vibrating components and simultaneously isolates vibrations to the vibrating bed.

The additive manufacturing system (100) also includes a controller (116). The controller (116) executes at least two different extraction modes during a build material extraction period. The modes may be defined by the vibration characteristics and/or the airflow. For example, the extraction modes may differ in regards to at least one of vibration frequency, vibration intensity, vibration duty cycle, and vacuum airflow. For example, during a first mode, the vibration frequency may be first value, and during a second mode may be a second value that is greater than the first value. Similarly, the vibration intensity and/or vibration duty cycle may be a first value in a first mode, and during a second mode may be a second value that is greater than the first value. While specific reference is made to these characteristics being greater in a second mode than a first mode, any and each of them may be greater in the first mode than the second mode. Other examples of characteristics that may be changed by the controller (116) include a timing of extraction mode and a length of time of each extraction mode.

In some examples, the different extraction modes may be based on the build material. For example, prior to printing, or non-solidified build material extraction, a user may input a type of material. Based on the input type of material, the characteristics of at least one, and in some cases all, of the extraction modes are set. For example, if PA-12 nylon material is used, which has a very loose powder but in great quantities, the first and second extraction modes may be relatively gentle and the first extraction mode may have a longer duration. By comparison, with elastomer-based materials, more intense first and second extraction modes may be used; more intense meaning greater vibration frequency and/or vibration amplitude. Using extraction modes that are based on build material properties simplifies the extraction operation as a user does not have to input specific extraction characteristics, but can instead simply select a build material; which has extraction characteristics pre-selected.

In some examples, the at least two different extraction modes are based on a selected extraction sensitivity. Extraction sensitivity may be based on the dimensions, or size; of the 3D printed object. For example, a larger piece with thicker dimensions, may be able to handle more aggressive vibrating as compared to smaller pieces with smaller cross-sectional areas. The sensitivity may also be based on time demands. For example, if quick extraction is desired, a more aggressive, and less sensitive extraction setting could be chosen as compared to a more sensitive extraction setting if a quick extraction is not an issue. Similar to with the build material, the sensitivity may be input by a user, and characteristics of one, or all, of the extraction modes; i.e., vibration frequency, vibration intensity, and/or timing can be selected based on the user input.

According to the present system (100), more efficient non-solidified build material extraction is facilitated due to the combination of vibration and airflow. Also, a tailored extraction strategy is implemented by allowing a controller (116) to adjust extraction characteristics based on build material and a selected extraction sensitivity. The extraction process is also enhanced by conducting multiple extraction modes based on the stage of extraction.

Figure 2:
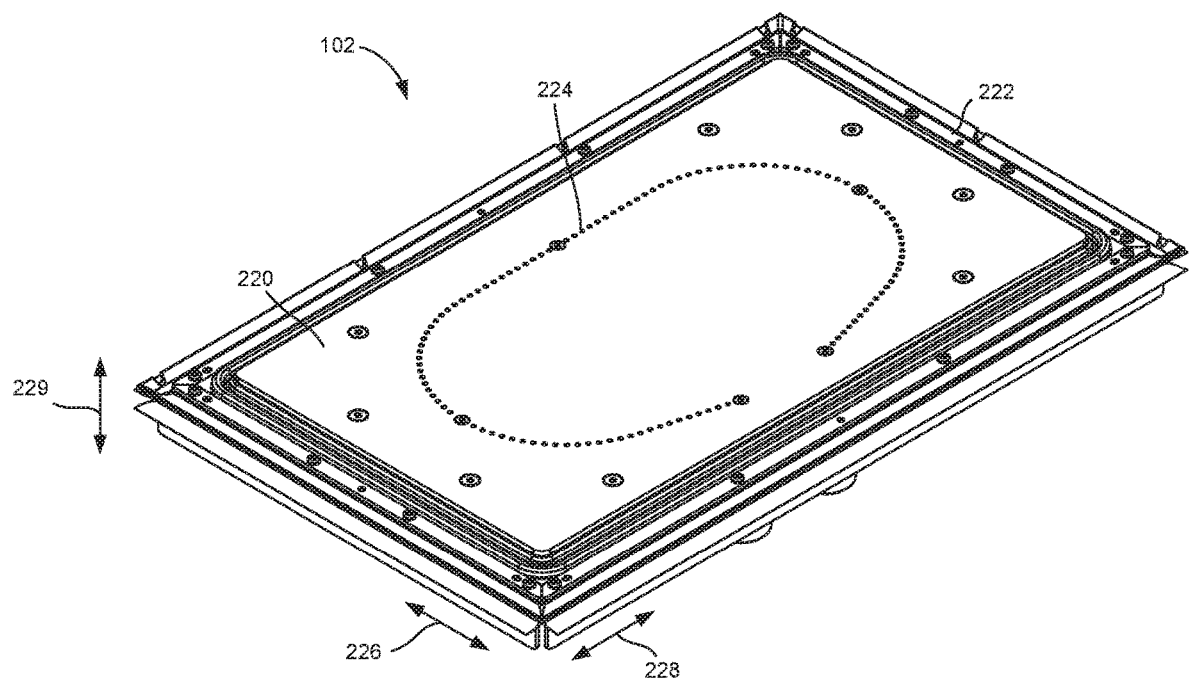
FIG. 2 is an isometric view of an additive manufacturing platform for build material extraction using vibration and airflow, according to an example of the principles described herein.

FIG. 2 is an isometric view of an additive manufacturing platform (102) for build material extraction using vibration and airflow, according to an example of the principles described herein. Specifically, FIG. 2 depicts the vibrating bed (220) that in part defines the build area (FIG. 1, 104) where additive manufacturing occurs.

During additive manufacturing, build material is placed on the vibrating bed (220). During additive manufacturing the vibrating bed (220) is not vibrating. As successive layers are formed on the vibrating bed (220), the vibrating bed (220) travels downward. Once an entire 3D object is formed, non-solidified build material is separated from the 3D object. This non-solidified build material can be returned to a reservoir and used in subsequent operations. Accordingly, the bed (220) includes a number of ports (224) through which the non-solidified build material falls to a chamber. In some examples, when a vacuum system is engaged, the non-solidified build material is drawn through the ports (224) via an air flow. For simplicity, a single port (224) is indicated with a reference number. The vibrating bed (22) operate to move the non-solidified build material around on the bed (220) such that it falls through the ports (224) to the reservoir. During a build operation, the vibrating bed does not vibrate and the vacuum system is not engaged.

Following completion of an additive manufacturing process, the vibrating bed (220) is activated such that it vibrates in the horizontal plane as defined by the arrows (226, 228). Such vibration moves the build material around the bed (220) such that it is drawn into them ports (224) to fall into a chamber and from there transferred to the reservoir. In some examples, in addition to vibrating in the horizontal plane, the vibrating bed (220) can vibrate in a vertical direction as indicated by the arrow (229).

However, not all of the components of the platform (102) are intended to vibrate. That is, the bed (220) may vibrate, but for other components, it may be desirable that they do not vibrate. For example, outside of the vibrating bed (220) there may be other mechanical devices such as bearings, screws, motors, and electrical connections that are disposed on the non-vibrating frame (222), which could be damaged by vibration. Accordingly, the present specification describes a platform (102) that 1) facilitates the vibration of the bed (220) while preventing vibration of the other components. Such a platform (102) includes an interface for allowing such relative motion.

The additive manufacturing platform (102) as described herein allows for the easy separation of non-solidified build material from build material that has been formed as part of a 3D object. The interface described herein isolates any vibration to be localized to the vibrating bed (220) and prevents these vibrations from reaching the non-vibrating frame (222).

Figure 3:
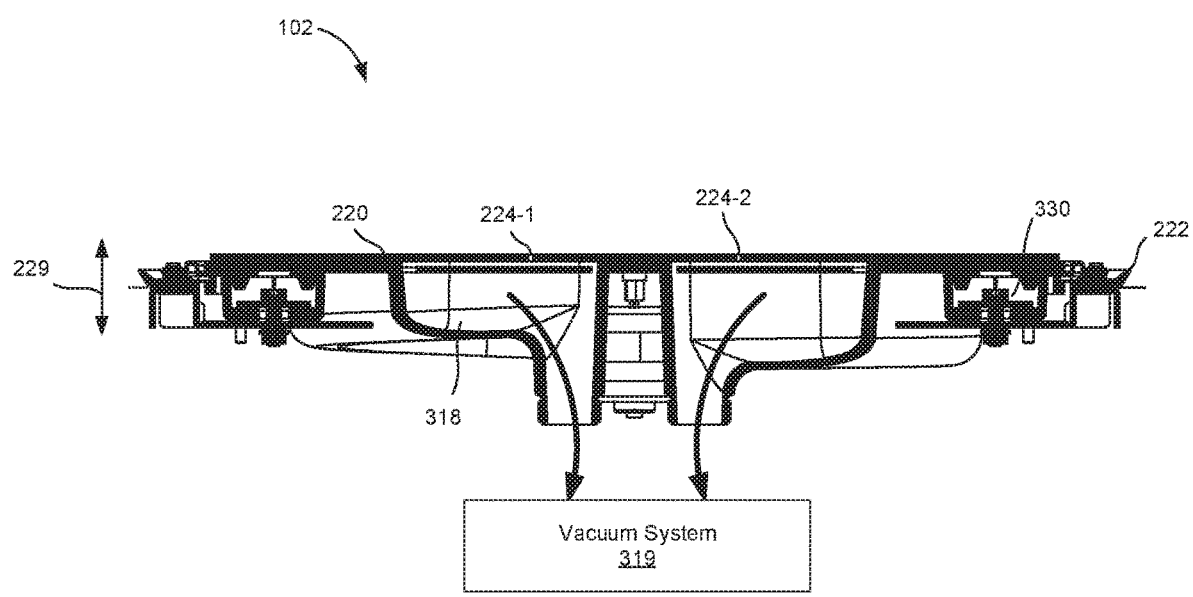
FIG. 3 is a cross-sectional view of an additive manufacturing platform for build material extraction using vibration and airflow, according to an example of the principles described herein.

FIG. 3 is a cross-sectional view of an additive manufacturing platform (102) for build material extraction using vibration and airflow, according to an example of the principles described herein. As described above, the additive manufacturing platform (102) includes a vibrating bed (220) that vibrates following additive manufacturing to remove excess non-solidified build material from the build area (FIG. 1, 104) to a chamber (318). From the chamber (318), a vacuum system (319) draws the non-solidified build material to a reservoir to be held for subsequent additive manufacturing operations.

Returning to the vibrating bed (220), the vibrating bed (220) may be vibrated from a number of vibrating sources. For example, an eccentric, or asymmetrical mass may be coupled to the vibrating bed (220) such that rotation of the asymmetrical mass causes the vibrating bed to vibrate in the horizontal plane. In another example, an eccentric shaft may be used to vibrate the vibrating bed (220) in the horizontal plane. In yet another example, an electromagnetic device, such as a voice coil, could be used to cause the vibrating bed (220) to vibrate. In some examples, in addition to vibrating in the horizontal plane, the vibrating bed (220) may vibrate in the vertical direction as indicated by the arrow (229). As described above, the vibrating bed (220) is joined to the non-vibrating frame (222) that supports it through an interface (330) that isolates the vibration to the vibrating bed (220).

The additive manufacturing platform (102) also includes a non-vibrating frame (222). The non-vibrating frame (222) supports the vibrating bed (220) as well as other components found within the additive manufacturing system (FIG. 1, 100). For example, during additive manufacturing, the vibrating bed (220) may be lowered such that additional layers of build material may be deposited and fused. The non-vibrating frame (222) may support the lift mechanism that facilitates this raising and lowering.

FIG. 3 also clearly depicts the removal of non-solidified build material through the ports (224-1, 224-2) to the chamber (318) and the removal of non-solidified build material from the chamber (318) to the reservoir by the vacuum system (319). That is, in some examples, a vacuum system (319) is coupled to the vibrating bed (220). As the vibrating bed (220) is vibrated, powder is drawn through the ports (224-1, 224-2) to a chamber (318). During extraction, a vacuum system (319) is engaged to draw the non-solidified build material to the reservoir.

In some examples, the platform (102) operates in two different extraction modes during a build material extraction period. During these two different modes, the airflow, or suction, provided by the vacuum system (319) may remain constant. That is, a certain airflow rate may be maintained across the various modes of the build material extraction period. In other examples, the air flow rate changes between the different extraction modes.

Figure 4:
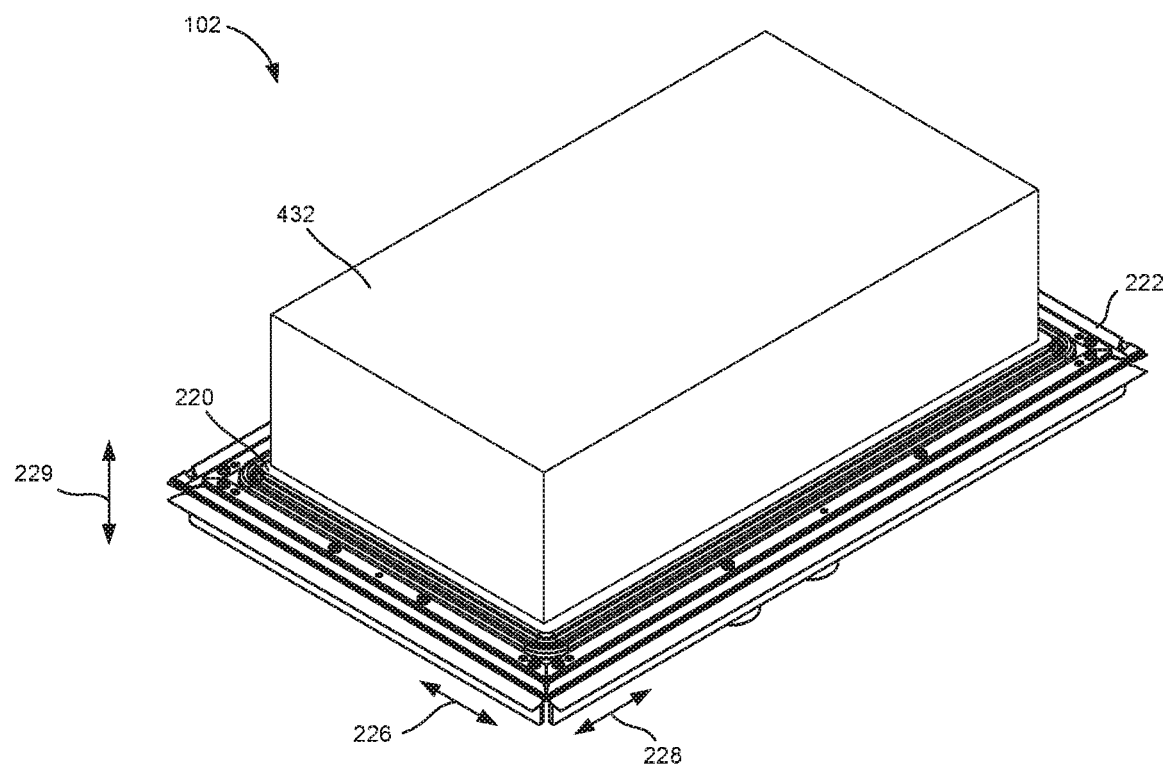
FIG. 4 is an isometric view of an additive manufacturing platform for build material extraction using vibration and airflow, according to an example of the principles described herein.

FIG. 4 is an isometric view of an additive manufacturing platform (102) for build material extraction using vibration and airflow, according to an example of the principles described herein. Specifically, FIG. 4 depicts the additive manufacturing platform (102) during a first, less intense, extraction mode. As described above, the vibrating bed (220) vibrates differently during the different extraction modes, the difference relating to vibration frequency, vibration intensity, and/or vibration duty cycle. That is, the vibrations may occur more frequently, may move a greater distance in the directions indicated by the arrows (226, 228, 229), or operate for a longer period of time relative to the extraction period. In some examples, the first extraction mode may be defined by lower frequency and/or lower intense vibrations. The vibrating bed (220) may be in this loose extraction mode, or first extraction mode, prior to a more aggressive, or second extraction mode.

Following additive manufacturing, a mass, or "cake" of build material (432) is disposed on the vibrating bed (220). Portions of this mass correspond to build material that has been fused via the fusing agent and other portions of this mass correspond to build material that is unfused. Accordingly, the mass includes an amount of loose unfused build material. Much of this mass may be far enough removed from the fused build material that it does not adhere to the part and can be removed relatively easy. That is, a lower frequency and/or lower intense vibration, can be used to remove the loose build material.

Figure 5:
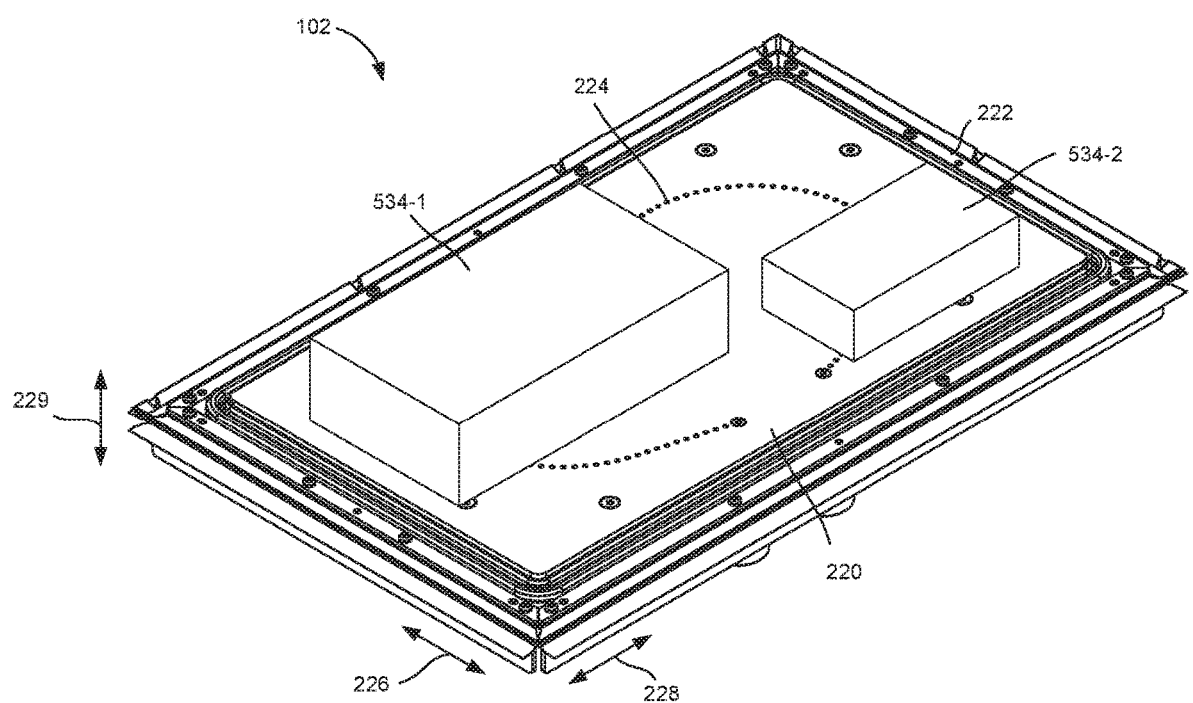
FIG. 5 is an isometric view of an additive manufacturing platform for build material extraction using vibration and airflow, according to an example of the principles described herein.

FIG. 5 is an isometric view of an additive manufacturing platform (102) for build material extraction using vibration and airflow, according to an example of the principles described herein. FIG. 5 depicts the additive manufacturing platform (102) during a second, more intense, extraction mode. Following a first, less intense, extraction mode when the loose, non-solidified build material has been removed, some non-solidified build material may be heat affected due to its proximity to the 3D printed object. That is, build material near a border of the 3D printed object may be temporarily stuck to the 3D printed object. In FIG. 5, the forms (534-1, 54-2) include the 3D printed object and heat affected build material that is temporarily adhered to the 3d printed object. To separate these agglomerations from the 3D printed object and to break them up to a size that can fall through, or be drawn through, the ports (224), a more intense vibrating may be desirable. Accordingly, during the second, and more intense, extraction mode vibration frequency and/or vibration intensity could be increased to increase the rate of non-solidified build material removal.

Figure 6:
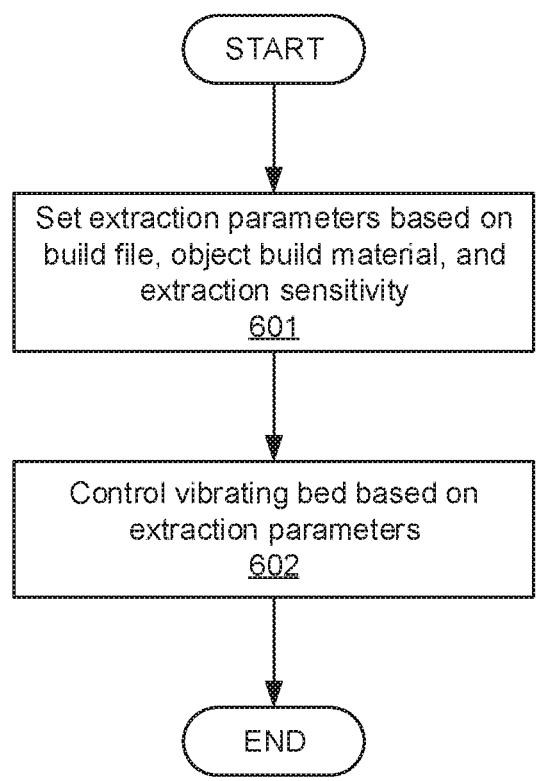
FIG. 6 is a flow diagram of a method for build material extraction using vibration and airflow, according to an example of the principles described herein.

FIG. 6 is a flow diagram of a method (600) for build material extraction using vibration and airflow, according to an example of the principles described herein. As a general note, the method (600) may be described below as being executed or performed by at least one device, for example, the controller (FIG. 1, 116). Other suitable systems and/or computing devices may be used as well. The method (600) may be implemented in the form of executable instructions stored on at least one machine-readable storage medium of at least one of the devices and executed by at least one processor of the controller (FIG. 1, 116). Alternatively or in addition, the method (600) may be implemented in the form of electronic circuitry (e.g., hardware). While FIG. 6 depicts operations occurring in a particular order, a number of the operations of the method (600) may be executed concurrently or in a different order than shown in FIG. 6. In some examples, the method (600) may include more or less operations than are shown in FIG. 6. In some examples, a number of the operations of the method (600) may, at certain times, be ongoing and/or may repeat.

According to the method, extraction parameters are set (block 601), which extraction parameters are to be used during the extraction of excess non-solidified build material. In some examples, these extraction parameters are set (block 601) via user input.

In another example, they are set by a computing device that is coupled to the additive manufacturing platform (FIG. 1, 102). For example, a build file for the 3D object is acquired. As described above, additive manufacturing devices make objects based on data in a 3D model of the object generated, for example, with a computer-aided drafting (CAD) computer program product. The data that defines the 3D object is referred to as the build file. The build file can include a wide variety of information regarding the 3D object. For example, the build file may include dimensional data for the 3D object including, but not limited to, height, width, cross-sectional area, etc. This build file may be acquired via an electrical connection with a computing device. In another example, the build file may be placed on a remote storage device which is inserted in, or otherwise coupled to, the controller (FIG. 1, 116).

Input regarding the object build material and extraction sensitivity are also received. Examples of extraction sensitivities may include gentle and quick. Specifically, this information may be input by a user to a computing device coupled to the additive manufacturing system (FIG. 1, 100) or a user interface disposed on the additive manufacturing system (FIG. 1, 100).

Based on the build file, the indicated object build material, and the indicated extraction sensitivity, the computing device can set the extraction parameters. For example, as described above, parameters such as extraction start time, a length of extraction, vibration characteristics, and an air flow rate may be set, which vibration characteristics could include setting the vibration frequency, vibration intensity, and/or vibration duty cycle. Parameters may be set (block 603) for the various extraction modes. For example, a parameters may be set (block 603) for a first, less intense, extraction mode and a parameters may be set (block 603) for a second, more intense, extraction mode.

As described above, different build materials may dictate different extraction parameters. For example, PA-12 build material may dictate a longer, and gentler first extraction mode due to the quantity of loose build material. By comparison, an elastomer build material may dictate a more aggressive first and second extraction mode, when compared to the extraction modes for PA-12 build material.

Still further, extraction parameters may be dictated by the desired extraction sensitivity. For example, if a part is larger and has thicker cross-sectional areas, a less sensitive, and quicker, extraction may be desired as compared to a smaller 3D part that has thinner cross-sectional areas.

Still further the characteristics, specifically, a length of extraction, can be dictated by the build file. For example, the build file may indicate an object height. Based on this height, a total length of extraction may be determined. That is, taller 3D objects may utilize more extraction time relative to shorter objects, due to an increased amount of non-solidified build material.

The vibrating bed (FIG. 2,220), and in some cases the vacuum system (FIG. 1, 116) are then controlled (block 604) based on the extraction parameters. That is, the vibrating bed (FIG. 2, 220) is set to operate at a specific frequency and intensity for a specific amount of time during each of the extraction modes based on the parameters that were set based on the build file, input object build material and desired sensitivity.

Setting (block 603) extraction parameters based on simple input information and a build file and then controlling (block 604) the components of the additive manufacturing system (FIG. 1, 100) based on those parameters simplifies the user experience during additive manufacturing. That is a user may not have to enter specific extraction mode characteristics, which may be technically involved and complex. Moreover by operating the additive manufacturing system (FIG. 1, 100) based on material properties and other criteria, the efficiency and quality of non-solidified build material extraction is enhanced.

In some examples, the method (600) also includes deactivating, or otherwise adjusting, the vibrating bed (FIG. 2, 220) and vacuum system (FIG. 3, 319) based on a rate of extraction falling below a threshold value. That is, the additive manufacturing system (FIG. 1, 100) may include a component that measures the amount of build material that has been removed, or the rate at which that build material is being removed. From this information, a rate of build material can be determined. If this rate of build material falls below a predetermined threshold value, the controller (FIG. 1, 116) can deactivate the vibrating bed (FIG. 2, 220) and the vacuum system (FIG. 3, 319). Doing so increases the efficiency of vibrating bed (FIG. 2, 220) and vacuum system (FIG. 3, 319) operation as they are not operated longer than is needed. It also simplifies the user experience as a user does not have to manually stop build material extraction. In another example, if it is determined that too much material is being removed, such that the vacuum system (FIG. 3, 319) or other component is being overwhelmed, the vibration and air flow may be adjusted accordingly.

Figure 7:
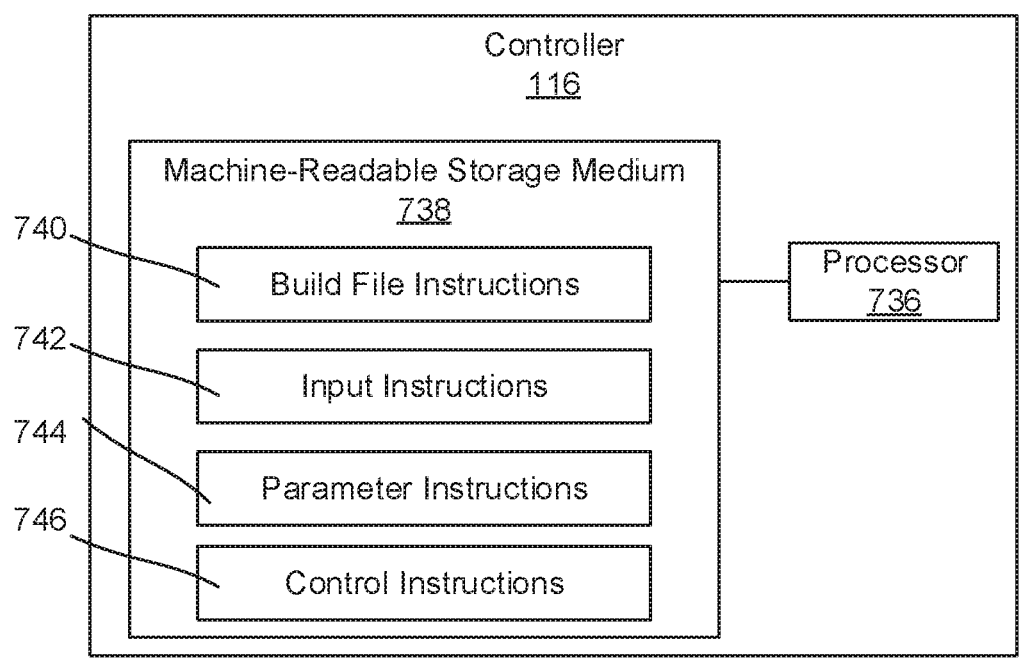
FIG. 7 is a diagram of a computing system for build material extraction using vibration and airflow, according to an example of the principles described herein.

FIG. 7 is a diagram of a controller (116) for build material extraction using vibration and airflow, according to an example of the principles described herein. To achieve its desired functionality, the controller (116) includes various hardware components. Specifically, the controller (116) includes a processor (736) and a machine-readable storage medium (738). The machine-readable storage medium (738) is communicatively coupled to the processor (736). The machine-readable storage medium (738) includes a number of instruction sets (740, 742, 744, 746) for performing a designated function. The machine-readable storage medium (738) causes the processor (736) to execute the designated function of the instruction sets (740, 742, 744, 746).

Although the following descriptions refer to a single processor (736) and a single machine-readable storage medium (738), the descriptions may also apply to a controller (116) with multiple processors and multiple machine-readable storage mediums. In such examples, the instruction sets (740, 742, 744, 746) may be distributed (e.g., stored) across multiple machine-readable storage mediums and the instructions may be distributed (e.g., executed by) across multiple processors.

The processor (736) may include at least one processor and other resources used to process programmed instructions. For example, the processor (736) may be a number of central processing units (CPUs), microprocessors, and/or other hardware devices suitable for retrieval and execution of instructions stored in machine-readable storage medium (738). In the controller (116) depicted in FIG. 7, the processor (736) may fetch, decode, and execute instructions (740, 742, 744, 746) for build material extraction using extraction modes. In one example, the processor (736) may include a number of electronic circuits comprising a number of electronic components for performing the functionality of a number of the instructions in the machine-readable storage medium (738). With respect to the executable instruction, representations (e.g., boxes) described and shown herein, it should be understood that part or all of the executable instructions and/or electronic circuits included within one box may, in alternate examples, be included in a different box shown in the figures or in a different box not shown.

The machine-readable storage medium (738) represents generally any memory capable of storing data such as programmed instructions or data structures used by the controller (116). The machine-readable storage medium (738) includes a machine-readable storage medium that contains machine-readable program code to cause tasks to be executed by the processor (736). The machine-readable storage medium (738) may be tangible and/or non-transitory storage medium. The machine-readable storage medium (738) may be any appropriate storage medium that is not a transmission storage medium. For example, the machine-readable storage medium (738) may be any electronic, magnetic, optical, or other physical storage device that stores executable instructions. Thus, machine-readable storage medium (738) may be, for example, Random Access Memory (RAM), a storage drive, an optical disc, and the like. The machine-readable storage medium (738) may be disposed within the controller (116), as shown in FIG. 7. In this situation, the executable instructions may be "installed" on the controller (116). In one example, the machine-readable storage medium (738) may be a portable, external or remote storage medium, for example, that allows the controller (116) to download the instructions from the portable/external/remote storage medium. In this situation, the executable instructions may be part of an "installation package". As described herein, the machine-readable storage medium (738) may be encoded with executable instructions for detecting a failing component in a device.

Referring to FIG. 7, build file instructions (740), when executed by a processor (736), may cause the controller (116) to acquire a build file for a three-dimensional object. Input instructions (742), when executed by a processor (736), may cause the controller (116) to receive input indicating an object build material and extraction sensitivity. Parameter instructions (744), when executed by a processor (736), may cause the controller (116) to set extraction parameters based on the build file, indicated object build material, and indicated extraction sensitivity. Control instructions (746), when executed by a processor (736), may cause the controller (116) to control a vibrating bed (FIG. 2, 220) and/or vacuum system (FIG. 3, 319) of an additive manufacturing platform (FIG. 1, 102) in accordance with the extraction parameters.

In some examples, the processor (736) and machine-readable storage medium (738) are located within the same physical component, such as a server, or a network component. The machine-readable storage medium (738) may be part of the physical component's main memory, caches, registers, non-volatile memory, or elsewhere in the physical component's memory hierarchy. In one example, the machine-readable storage medium (738) may be in communication with the processor (736) over a network. Thus, the controller (116) may be implemented on a user device, on a server, on a collection of servers, or combinations thereof.

The controller (116) of FIG. 4 may be part of a general-purpose computer. However, in some examples, the controller (116) is part of an application specific integrated circuit.

In summary, using such an additive manufacturing platform 1) allows for efficient additive manufacturing processes by re-using non-solidified build material, 2) increases the amount of non-solidified build material that is recycled via a vibrating platform that directs non-solidified build material to vacuum ports, 3) delivers 3D printed objects that are completed with fewer post-processing operations; and 4) combines airflow and vibration which reduces the magnitude of each, as compared to when each is used alone. However, it is contemplated that the devices disclosed herein may address other matters and deficiencies in a number of technical areas.

The preceding description has been presented to illustrate and describe examples of the principles described. This description is not intended to be exhaustive or to limit these principles to any precise form disclosed. Many modifications and variations are possible in light of the above teaching.

What is claimed is:

1. An additive manufacturing platform, comprising:
   a vibrating bed on which a volume of build material is to be disposed, wherein the vibrating bed is to vibrate to remove excess build material;
   a non-vibrating frame to support the vibrating bed;
   ports in the vibrating bed through which the excess build material is removed when the vibrating bed vibrates;
   a sensor to measure an amount of build material removed; and
   a controller to:
      receive an object build file;
      set extraction parameters based on the object build file, wherein the extraction parameters comprise at least one of an extraction start time, a length of extraction, vibration characteristics, and an air flow rate; and
      selectively activate the vibrating bed and ports based on a measured rate of extraction falling below a threshold value.

2. The additive manufacturing platform of claim 1, wherein:
   the vibrating bed operates in at least two extraction modes during a build material extraction period; and
   the at least two extraction modes differ in vibrating characteristics.

3. The additive manufacturing platform of claim 2, wherein:
   a first extraction mode operates at a first vibrating mode; and
   a second extraction mode operates at a second vibrating mode that is different than the first vibrating mode.

4. The additive manufacturing platform of claim 3, wherein:
the vibrating bed operates in the first extraction mode prior to operating in the second extraction mode to remove loose excess build material; and
the vibrating bed operates in the second extraction mode following operating in the first extraction mode to remove agglomerated excess build material from a finished object.

5. The additive manufacturing platform of claim 1, wherein excess build material is removed to a chamber through vibration of the vibrating bed and then extracted to a reservoir using a vacuum system.

6. The additive manufacturing platform of claim 1, wherein the vibrating bed vibrates in a horizontal plane.

7. The additive manufacturing platform of claim 1, further comprising
a vacuum system to create an airflow through ports in the vibrating bed,
wherein the vibrating bed is vibrated and the vacuum system is operated simultaneously to remove excess build material by a combination of vibration and airflow.

8. An additive manufacturing system, comprising:
a build material distributor to successively deposit layers of build material into a build area;
at least one agent distributor including at least one liquid ejection device to selectively distribute fusing agent onto the layers of build material; and
a platform that defines a build area, wherein the platform comprises:
a vibrating bed on which a volume of build material is to be disposed, wherein the vibrating bed is to vibrate:
to remove excess build material into a chamber; and
in sequentially more intense extraction modes;
a non-vibrating frame to support the vibrating bed;
a vacuum system to draw excess build material from the chamber to the reservoir;
a sensor to measure an amount of excess build material removed; and
a controller to:
receive an object build file;
set extraction parameters based on the object build file, wherein the extraction parameters comprise at least one of an extraction start time, a length of extraction, vibration characteristics, and an air flow rate;
control extraction modes during a build material extraction period; and
selectively activate the vibrating bed and vacuum system based on a measured rate of extraction falling below a threshold value.

9. The additive manufacturing system of claim 8, wherein the extraction modes comprise at least two different extraction modes which differ in regards to at least one of:
vibration frequency;
vibration intensity;
vibration duty cycle.

10. The additive manufacturing system of claim 9, wherein the at least two different extraction modes are based on at least one of the build material and a selected extraction sensitivity.

11. The additive manufacturing system of claim 9, wherein:
the platform comprises walls that extend from the platform; and
the walls, in addition to the platform, vibrate to remove excess build material.

12. The additive manufacturing system of claim 9, wherein the at least two extraction modes differ in air flow rates.

13. The additive manufacturing system of claim 8, wherein the controller is to select vibration characteristics based on a build material type.

14. The additive manufacturing system of claim 8, wherein the controller is to select vibration characteristics based on a size and dimension of a three-dimensional (3D) printed object.

15. The additive manufacturing system of claim 8, wherein:
an airflow in a first extraction mode is the same as an airflow in a second extraction mode; and
a vibration characteristic in the first extraction mode is different than a vibration characteristic in the second extraction mode.

16. A method, comprising:
receiving an object build file for a three-dimensional object;
setting extraction parameters for an extraction of excess build material based on the object build file, an object build material, and a desired extraction sensitivity, wherein the extraction parameters comprise at least one of an extraction start time, a length of extraction, vibration characteristics, and an air flow rate;
measuring, with a sensor, an amount of build material removed;
selectively activating a vibrating bed based on a measured rate of extraction falling below a threshold;
controlling the vibrating bed of an additive manufacturing platform in accordance with the extraction parameters; and
vibrating the bed to remove excess build material through ports in the vibrating bed.

17. The method of claim 16, wherein the build file indicates an object height.

18. The method of claim 16, further comprising:
acquiring the build file for the three-dimensional object;
receiving input indicating the object build material and the desired extraction sensitivity; and
deactivating the vibrating bed and vacuum system based on a rate of extraction falling below a threshold value.

19. The method of claim 16, further comprising:
controlling the vibrating bed of an additive manufacturing platform and a vacuum system in accordance with the extraction parameters,
wherein the vibrating bed is vibrated and the vacuum system is operated simultaneously to remove excess build material by a combination of vibration and airflow.

* * * * *